Jan. 16, 1968  N. VAN LOOKEREN CAMPAGNE ET AL  3,364,138
SEPARATING ASPHALTENES AND RESINS WITH ALKANE
AND ALCOHOL TREATMENT
Filed March 4, 1966
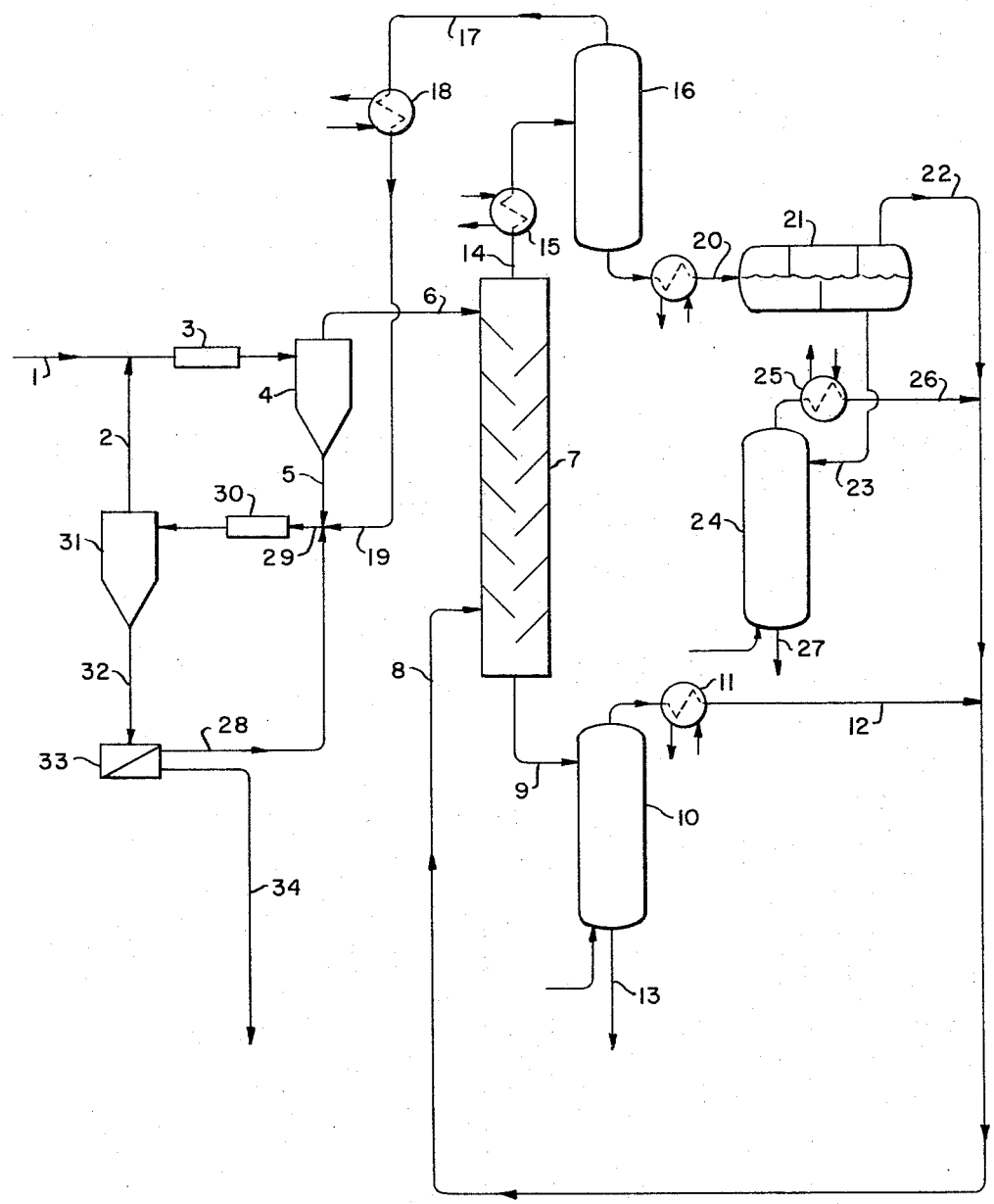
INVENTORS:
NICOLAAS VAN LOOKEREN CAMPAGNE
HEINZ VOETTER
BY: *Marion W. Western*
THEIR AGENT

United States Patent Office 3,364,138
Patented Jan. 16, 1968

3,364,138
SEPARATING ASPHALTENES AND RESINS WITH ALKANE AND ALCOHOL TREATMENT
Nicolaas Van Lookeren Campagne and Heinz Voetter, Amsterdam, Netherlands, assignors to Shell Oil Company, New York, N.Y., a corporation of Delaware
Filed Mar. 4, 1966, Ser. No. 531,868
7 Claims. (Cl. 208—309)

ABSTRACT OF THE DISCLOSURE

A process for the separation of residual petroleum fractions into asphaltenes, resins and oils by (a) treating the residual petroleum fractions with a hydrocarbon precipitant thereby causing asphaltenes to precipitate, (b) adding to the asphaltene depleted oil an alcohol thereby forming two immiscible phases comprising an oil extract phase and the resinous raffinate phase, (c) separating the phases and (d) recovering the oil and resins in the separated phases by removing the hydrocarbon precipitant and alcohol.

---

This invention relates to a method for the separation of oil from residual petroleum fractions containing oil, asphaltenes and resins.

According to conventional methods of preparing oils free of asphaltenes and resins from asphalt-containing residues the residue is first subjected to a fractional distillation in order to obtain light and medium oil fractions. Subsequently, the remaining heavy residue, or the so-called "short residue," is deasphalted with the aid of liquid propane. The deasphalted residue can then be used as a feedstock for catalytic cracking units or as a starting material for the preparation of base lubricating oils.

One of the disadvantages of the conventional de-asphalting treatment of residues with propane is that a relatively large part of the residue, e.g., in many cases 60 percent by volume or more, is removed as being unsuitable. As a result of this removal, the yield of valuable lubricating oil components is proportionally low.

It has now been found that a considerably higher yield of lubricating oil or other valuable oils may be obtained from asphalt-containing residual petroleum fractions if only the asphaltenes and resinous materials are removed from the residue. According to the invention, this selective removal of undesirable components is effected by first removing the asphaltenes from the asphaltene-containing residue by precipitation of the asphaltenes with a hydrocarbon solvent containing at least four carbon atoms and separation of the precipitated asphaltenes. Next an alcohol or an alcohol mixture is added to the asphaltene depleted oil solution thereby forming two immiscible phases, i.e., an oil solution which is resin-free or substantially resin-free and a solution of the resinous components, which can be separated as desired.

The invention therefore relates primarily to a process for the separation of residual petroleum fractions into asphaltenes, resins and oil by the steps of (a) treating the residual fraction with a hydrocarbon precipitant containing at least four carbon atoms thereby causing the asphaltenes to precipitate in solid for, and separating the asphaltenes thus precipitated, (b) adding to the asphaltene depleted oil solution an alcohol or mixtures of alcohols thereby forming two immiscible phases, namely, an oil phase which is substantially free of resins and a resinous phase, (c) separating said phases and (d) recovering the oil and resins from these separated phases by removing the hydrocarbon precipitant and the alcohol therefrom by distillation or any other appropriate method.

This invention stems from the knowledge that relatively large quantities of the material removed from asphalt-containing residues by the usual treatment with propane, i.e., propane deasphalting, contain a considerable content of potential lubricating oil components and is based upon the discovery that these components can be maintained in the residue by an unobvious yet relatively simple method of removing only the asphaltenes and the resinous compounds from the residue. As compared with oils that have been obtained by propane deasphalting the oils obtained according to the present invention contain as additional components a complex mixture of relatively high molecular weight hydrocarbons. These components are partly of a naphthenic and polyaromatic structure and can be converted into valuable lubricating oil components by conventional means such as catalytic treatment with hydrogen at elevated temperature and pressure. As a result of the hydrogen treatment the molecular structures are changed, for example, by light cracking thereby producing hydrocarbons having good viscosity properties. Other advantages of the hydrogen treatment lie in the upgrading of the other oil components in addition to the removal of sulfur and nitrogen compounds which may be present.

According to the invention the asphaltenes are precipitated in solid form, one precipitant used being at least a $C_4$ hydrocarbon or hydrocarbon mixture. The hydrocarbon component usually consists of one or more aliphatic hydrocarbons having from 4 to 10 carbon atoms in the molecule. Instead of pure hydrocarbons or mixtures thereof, technical mixtures, such as hydrocarbon oil fractions, e.g., light low-aromatic naphtha fractions with boiling ranges between 10 and 150° C. may be used. These mixtures may also contain minor quantities of other hydrocarbons as long as the mixture as such retains the character of at least a $C_4$ hydrocarbon. For the sake of simplicity the invention will be described hereinafter mainly as using pentane or pentane-containing mixtures, which are preferably applied as precipitant for the asphaltenes.

The precipitation is usually carried out at slightly elevated temperatures, since this promotes the agglomeration of the precipitated particles. The maximum temperature to be applied in the precipitation and agglomeration is determined by the softening point of the asphaltenes in this medium. Temperatures of from about 30 to about 150° C. are usually applicable. As a rule about 2 to 10 parts by volume and preferably 4 to 6 parts by volume of precipitant is used per part by volume of residual petroleum fraction.

The precipitation may be carried out both batchwise and continuously. A continuous embodiment of the process is preferred as described, for example, in British Patent 935,725. To this end the residual oil is passed, together with the precipitant for the asphaltenes, into a mixing device where the average residence time of the mixture is from 0.5 to 10 minutes. Subsequently, the mixture with agglomerated asphaltene particles is passed through one or more hydrocyclones and/or multicyclones, the oil phase draining from the overflow aperture and the asphaltene concentrate draining from the apex aperture being collected separately.

While the hydrocyclones used do not form a part of this invention, for economic reasons preference is given to a hydrocyclone, or hydrocyclones, with such dimensions that the pressure drop across them does not exceed 10 atmospheres gauge. A good sharp separation of the asphaltenes is obtained under these conditions. Suitable hydrocyclones are those whose largest inside diameter is from about 1 to 20 centimeters. Conditions are preferably controlled in such a way that the asphaltene content of the discharged oil after removal of the precipitant is less than 1 percent by weight and preferably less than 0.5 percent by weight. To this end hydrocyclones are utilized having a diameter relationship of inlet, overflow aperture and apex aperture to each other of 1.5:3:1 to 2.5:3:2 and wherein from 75 to 95 percent of the oil mixture introduced to the hydrocyclone is discharged via the overflow aperture. Good results are obtained with hydrocyclones whose cylindrical part has a diameter of 10 mm., the diameters of inlet, overflow aperture and apex aperture being 2 mm., 3 mm. and 1.5 mm. respectively. At a supply pressure of 5 atmospheres gauge the throughout of this hydrocyclone is 150 liters of asphaltene suspension per hour. Good results were also obtained with a hydrocyclone whose cylindrical part had a diameter of 25 mm., the diameters of the inlet, overflow aperture and apex aperture being 5 mm., 7.5 mm. and 3.75 mm. respectively and whose throughput at a supply pressure of 2.5 atmospheres gauge amounts to 1 m.³ per hour. The throughput of an operation using hydrocyclones whose cylindrical part had a diameter of 100 mm., the diameters of inlet, overflow aperture and apex aperture being 20 mm., 30 mm. and 15 mm. respectively amounted to 30 m.³ per hour.

In order to increase the throughput, several hydrocyclones can be connected in parallel. This can be very well effected by applying so-called multicyclones which are understood to be constructional units containing a large number of hydrocyclones and which are usually provided with one inlet line and two discharge lines.

If desired, the sharpness of separation can be increased by applying hydrocyclones connected in series. When supplying hydrocyclones connected in series it is desirable, in order to obtain asphaltenes with a low oil content, to dilute the asphaltene suspension, which is obtained from the apex aperture(s) of the first hydrocyclone or multicyclone, with precipitant, before it is passed into the second hydrocyclone or multicyclone. So much precipitant is then preferably added that the oil content of the liquid phase of the asphaltene suspension is 2.5 percent by volume or less. The suspension of solid asphaltene particles leaving the cyclone can then be easily filtered. The asphaltenes retained on the filters have a dry and powdery appearance after removal of the liquid left in the filter cake.

The liquid passing out of the overflow aperture of the hydrocyclone or multicyclone consists of an asphaltene or substantially asphaltene-free solution of oil in hydrocarbon precipitant. This oil solution is mixed with an alcohol or mixture of alcohols which acts as an anti-solvent. This results in the formation of two immiscible phases, namely, a resin-containing raffinate phase and an oil-containing extract phase which can be easily separated, for example, by decanting. After removal of the hydrocarbon/alcohol mixture the extract phase yields an oil which contains little, if any, asphaltenes or resins. The raffinate phase contains the resinous components from the oil. The separation of the raffinate and extract phases is preferably carried out continuously and in countercurrent. For this purpose the various procedures known for extraction can be applied.

The alcohol components preferably used consists of one or more aliphatic alcohols with from 1 to 4 carbon atoms in the molecule. There is no objection to these preferred alcohols containing other alcohols and/or water, as long as the mixture as such retains the character of aliphatic alcohols with from 1 to 4 carbon atoms. The extracting agent, i.e., the hydrocarbon/alcohol mixture, preferably contains not more than two percent by volume water.

Particularly good results can be obtained with an extracting agent consisting of a combination of pentane as the hydrocarbon component and a methyl alcohol/isopropyl alcohol mixture as the alcohol component. A combination of from 50 to 75 parts by volume of pentane, 15 to 35 parts by volume of methyl alcohol and from 10 to 20 parts by volume of isopropyl alcohol is particularly suitable.

The separation of the deasphaltenized oil into oil components and resinous components is, as a rule, carried out with from 2.5 to 13 parts by volume and preferably from 5 to 8 parts by volume of hydrocarbon/alcohol mixture per part by volume of deasphaltenized oil.

The choice of the solvent ratio in a particular case depends, among other factors, on the type of residue used as starting material. Relatively high solvent ratios, which usually promote a rapid phase separation, may well be used considering the low cost involved in removing the solvents from the raffinate and extract phases.

Contrary to propane deasphalting, it is possible to carry out the extraction with the present hydrocarbon/alcohol mixture at normal temperatures and pressures. In addition, the distillation cost can be reduced to a considerable extent by carrying out the extraction with a hydrocarbon/alcohol mixture, the hydrocarbon component of which has a lower boiling point or range than the alcohol. In that case it is only the lower boiling hydrocarbon component that has to be distilled off and demixing between the oil and the alcohol then occurs. The alcohol layer forming spontaneously can be easily separated from the oil, for example, by decanting, and is then recycled to the process.

It is observed that in distilling off the hydrocarbon component in particular cases a certain amount of alcohol may be distilled with the hydrocarbon. This is the case when applying a combination of pentane, methyl alcohol and isopropyl alcohol. The pentane distilled over may then contain from about 5 to 15 percent of methyl alcohol. Such an alcohol-containing hydrocarbon can be applied in the precipitation of the asphaltenes without difficulty.

According to the process of the present invention, the asphalt-containing residue is separated into three valuable fractions, each of which may find a useful application. For example, as the asphaltenes and resins are obtained separately, it is possible to use them for the preparation of synthetic asphaltic bitumens with a high or low viscosity index, respectively.

The asphaltene and resin depleted oil can be applied for several purposes, for example, as a feedstock for a catalytic cracking unit. As stated earlier, the oil can also be used as a starting material for the preparation of base lubricating oils. As compared to usual propane deasphalting, it is possible to obtain a considerably higher yield of lubricating oil since a relatively large part of hydrocarbons from the residue remain in the deasphaltenized oil. Due to the presence of polyaromatics in these hydrocarbons, in many cases the deasphaltenized oil is not suitable for working up as such into lubricating oils by extraction and dewaxing. However, by subjecting the oil to a catalytic treatment with hydrogen at elevated temperature and pressure above compounds are converted into valuable lubricating oil components with good viscosity properties. This conversion is also attended with the removal of sulfur and nitrogen. Furthermore, in particular at elevated reaction temperatures, a certain quantity of lower molecular hydrocarbons are formed as a result of hydrocracking. This results in a drop in oil viscosity which increases with the hydrogenating temperature. This drop in viscosity is counterbalanced by the relatively high viscosity of the deasphaltenized oil. The yield of residual lubricating oil, which is obtained from the deasphaltenized oil treated with hydrogen after removal of light and medium lubricating oil components, is usually at least 50 percent higher than the one obtained according to the conventional mode of preparation, its viscosity being equal to, or higher than, that of the conventional oil.

The hydrogen treatment is carried out at elevated temperatures and pressures with the aid of a catalyst containing at least one element from the left-hand column of the sixth group and at least one element from the eighth group of the Periodic System of elements. These elements are preferably present in the form of their sulfide and as a rule they are supported on a carrier.

As carriers, for example, natural or synthetic alumina and/or silica-containing materials may be used. A certain silica content may be advantageous, since it promotes ring opening of polyaromatic and naphthenic structures. Examples of suitable catalysts are combinations of nickel sulfide and/or cobalt sulfide with molybdenum sulfide and/or tungsten sulfide. The atomic ratio of the metals of the eighth group to the metals of the left-hand column of the sixth group is, as a rule, between 1:20 and 1:1. The reaction temperature is usually between 370 and 430° C.; temperatures between 380 and 420° C. are preferred, however. Above 420° C. hydrocracking will occur to a considerable extent, as a result of which the yield of lubricating oil is affected adversely. The hydrogen treatment is usually carried out at a pressure of at least 100 atm. and preferably above 150 atm.

The space velocity amounts, as a rule, to from 0.5 to 5 kg. and preferably to from 1 to 3 kg. of deasphalted oil per hour per liter of catalyst. The hydrogen/oil ratio is usually between 100 and 1000 liters (S.T.P.) and preferably between 200 and 500 liters (S.T.P.) of hydrogen per kg. of oil.

After the hydrogen treatment, or treatments, the lubricating oil is usually subjected to a fractional distillation in vacuo to separate tops and to obtain light and/or medium lubricating oil distillates and the residual lubricating oil. The fractions obtained may subsequently be extracted by conventional methods to remove aromatic compounds, etc., after which, if desired, the raffinates are dewaxed.

It is observed that, if desired, the dewaxing procedure according to the present process may be performed before the hydrogen treatment, i.e., immediately after the deasphalting process. This is advantageous, for instance, in those cases in which the same type of hydrocarbon/alcohol mixture is used for dewaxing and deasphaltenizing.

Starting materials which may be used according to the invention include both residues obtained by straight-run distillation of crude oils and residues originating from thermal of catalytic cracking processes. However, residues originating from paraffinic crude oils are preferred as starting materials. Furthermore, preferred starting materials are the so-called "short residues," i.e., residues not containing light or medium lubricating oil components.

The present process is preferably carried out continuously. To this end the asphalt-containing base oil is mixed continuously and for some time with the hydrocarbon precipitant mixture containing a minor amount of oil and originating from the process, after which the precipitated asphaltene-containing mixture is passed into a (first) cyclone or multicyclone. From the overflow aperture of the cyclone a product (I) is obtained consisting of a solution of entirely or substantially deasphaltenized oil in precipitant. Via the apex aperture of this cyclone a product (II) consisting of a suspension of asphaltene particles in oil-containing precipitant is obtained, which product (II) is subsequently mixed with a precipitant which also originates from the process but which contains relatively little oil or none at all, after which the dilute suspension is passed through a second cyclone or multicyclone. From the overflow aperture of the second cyclone a product (III) is obtained which serves as a precipitant for the base oil and from which via the apex aperture of this cyclone a product (IV) is obtained consisting of a concentrated suspension of asphaltene particles. This suspension, if desired, is separated in a filtration unit into a filter cake, which yields dry asphaltenes in powder form, and a filtrate which is recycled to the process as precipitant. Product I, consisting of a solution of entirely or substantially deasphaltenized oil in precipitant is passed into a multistage countercurrent extraction system. On one side of the system product I is introduced and on the other side an anti-solvent originating from the process and mainly consisting of a mixture of one or more aliphatic alcohols with from 1 to 4 carbon atoms in the molecule and a relatively small quantity of at least $C_4$ hydrocarbon (hydrocarbons) is fed in. On the alcohol fed side of the extraction system a resin-containing "raffinate phase" is discharged, from which the resins are obtained by evaporation of the anti-solvent components, which are recycled to the process. On the other side of the extraction system an oil-containing "extract phase" is discharged, from which the oil is obtained by removal of the anti-solvent components, which are recycled to the process.

The invention may best be illustrated with reference to the enclosed drawing which shows a schematic flow diagram of a preferred embodiment of the invention and is described in detail in the following example.

*Example*

The starting material was a residual oil fraction, which had been obtained by straight-run distillation of an asphaltic crude oil originating from the Middle East. This residue was subjected to fractional distillation to obtain a light and a medium lubricating oil fraction.

The remaining asphalt-containing residue, having a sulfur content of 4.5% w. and a kinematic viscosity of 1100 cs. at 210° F., was separated into a deasphaltenized oil, asphaltenes in powder form and a viscous resin concentrate in a continuously operating plant, as indicated diagrammatically in the figure.

To this end 100 parts by weight per hour of the asphalt-containing residue, having been heated at 45° C., was supplied under continuous flow conditions via line 1 (see figure) and mixed with 593 parts by weight per hour of precipitant (45° C.), which via line 2, came from the plant. The composition of the precipitant was 532 parts by weight of pentane, 53 parts by weight of methyl alcohol and 8 parts by weight of oil components. The mixture of asphalt-containing oil and precipitant was conveyed to hydrocyclone 4 via mixer 3. The residence time in the mixer amounted to 2.5 minutes, which was sufficiently long to cause precipitation of the asphaltenes present in the residue and to effect the desired agglomeration of the primarily precipitated asphaltene particles to larger units.

On the side of the overflow aperture of cyclone 4, via line 6, a quantity of 583 parts by weight per hour of oil solution was discharged of which the composition was: 86 parts by weight of oil, 452 parts by weight of pentane and 45 parts by weight of methyl alcohol. This oil solution was brought into contact with a pentane-containing alcohol mixture as anti-solvent in a column (7) provided with baffles. The oil solution was introduced continuously via line 6 near the top of the column, a quantity of 385 parts by weight per hour of anti-solvent being also continuously fed in via line 8 near the bottom of the column. The anti-solvent originated from the process; its composition was: 195 parts by weight of methyl alcohol, 140 parts by weight of isopropyl alcohol, 48 parts by weight of pentane and 2 parts by weight of deasphaltenized oil.

The viscous raffinate phase, which contained 30 parts by weight of resin components, 2 parts by weight of methyl alcohol and 2 parts by weight of isopropyl alcohol, flowing off, via line 9 at the bottom of the column, in a quantity of 34 parts by weight per hour, was fed continuously into a stripping column 10, where with the aid of nitrogen the volatile components were removed to be recycled to the process via cooler 11 and line 12. The resins which, via line 13, were withdrawn from the process in a quantity of 30 parts by weight per hour, had the following properties: viscosity at 210° F. 1250 cs., Conradson Carbon residue 17% w.

At the top of the extraction column (7) 934 parts by weight per hour of oil-containing extract phase flowed off in the form of a clear liquid. The composition of the extract phase was as follows: 58 parts by weight of deasphaltenized oil, 500 parts by weight of pentane, 238 parts by weight of methyl alcohol and 138 parts by weight of isopropyl alcohol. Via line 14 and heat exchanger 15 the extract phase was passed into column 16 to evaporate off 452 parts by weight of pentane per hour and 45 parts by weight of methyl alcohol per hour, which via line 17 and after condensation in cooler 18 via line 19, were recycled to the process. The heterogeneous mixture of deasphaltenized oil, pentane and alcohols with a composition of 58 parts by weight of deasphaltenized oil, 48 parts by weight of pentane, 193 parts by weight of methyl alcohol and 138 parts by weight of isopropyl alcohol, flowing off at the bottom of this column (16) was introduced after having been cooled down to 20° C., via line 20 into settling tank 21, at the top of which the separated alcohol mixture was recycled to the process via line 22; the composition of the mixture was 2 parts by weight of deasphaltenized oil, 3 parts by weight of pentane, 191 parts by weight of methyl alcohol and 138 parts by weight of isopropyl alcohol. The deasphaltenized oil separated in settling tank 21 was fed via line 23 into stripping column 24, where with the aid of nitrogen any extracting agent left was removed, to be recycled to the process via condenser 25 and line 26. At the bottom of the stripping column (24) deasphaltenized oil was obtained via line 27 in a quantity of 56 parts by weight, with a viscosity at 210° F. of 50 cs. and a Conradson Carbon residue of 6% w.

The asphaltene suspension draining via line 5 from the apex aperture of cyclone 4 was diluted with the pentane/methyl alcohol mixtures recovered from the process via lines 19 and 28, to be passed into cyclone 31 via line 29 and mixer 30. The composition of the dilute suspension conveyed to cyclone 31 was: 14 parts by weight of asphaltenes, 8 parts by weight of oil, 582 parts by weight of pentane and 58 parts by weight of methyl alcohol. On the side of the apex aperture of cyclone 31 a quantity of 69 parts by weight of asphaltene concentrate was conveyed via line 32 to the filtration unit 33, where via line 34, 14 parts by weight per hour of dry asphaltenes was recovered. The filtrate consisting of a mixture of 50 parts by weight of pentane and 5 parts by weight of methyl alcohol was recycled to the process via line 28.

We claim as our invention:
1. A process for the separation of a residual petroleum fraction into asphaltenes, resins and oil which comprises the steps of:
(a) treating the residual petroleum fraction with a hydrocarbon precipitant selected from the group consisting of aliphatic hydrocarbons containing from four to ten carbon atoms and mixtures thereof thereby causing the asphaltenes to precipitate in solid form and separating the asphaltenes thus precipitated;
(b) adding to the asphaltene depleted oil solution an alcohol solution having a higher boiling range than the hydrocarbon precipitant thereby forming two immiscible phases comprising an oil-precipitant-alcohol extract phase substantially free of resins and a resinous raffinate phase;
(c) separating the extract phase from the resinous raffinate phase;
(d) distilling the precipitant from the extract phase thereby causing the extract to separate into two immiscible phases comprising an alcohol phase and an oil phase; and
(e) withdrawing the alcohol phase and recovering as product a substantially asphaltene-free resin-free oil.

2. A process according to claim 1 wherein the hydrocarbon precipitant consists of pentane or a pentane-containing mixture.

3. A process according to claim 1 wherein the precipitation of the asphaltenes takes place at a temperature of from about 30 to 150° C. and with from about 2 to 10 parts by volume of precipitant per part by volume of residual petroleum fraction.

4. A process according to claim 1 wherein the alcohol solution consists of a member selected from the group of aliphatic alcohols containing from one to four carbon atoms and mixtures thereof.

5. A process according to claim 1 wherein the separation of the asphaltene depleted oil into an oil-containing extract phase and a resin containing raffinate phase takes place with a hydrocarbon-alcohol extract mixture which consists of from 50 to 75 parts by volume pentane, from 15 to 35 parts by volume of methyl alcohol and from 10 to 20 parts by volume of isopropyl alcohol.

6. A process according to claim 5 wherein the separation takes place with from 2.5 to 13 parts by volume of hydrocarbon-alcohol mixture per part by volume of asphaltene depleted oil.

7. A process according to claim 1 wherein the asphaltene and resin free oil is subjected to a catalytic treatment with hydrogen at elevated temperature and pressure in the presence of a catalyst which contains at least one element from the left-hand column of the sixth group and at least one element from the eight group of the Periodic System of elements.

References Cited
UNITED STATES PATENTS

| | | | |
|---|---|---|---|
| 2,943,047 | 6/1960 | Reeg et al. | 208—45 |
| 3,206,388 | 9/1965 | Pitchford | 208—45 |
| 3,228,870 | 1/1966 | Pitchford | 208—45 |

HERBERT LEVINE, *Primary Examiner.*